March 1, 1927. 1,619,130
L. W. JONES
SAFETY STOP VALVE
Filed April 26, 1926
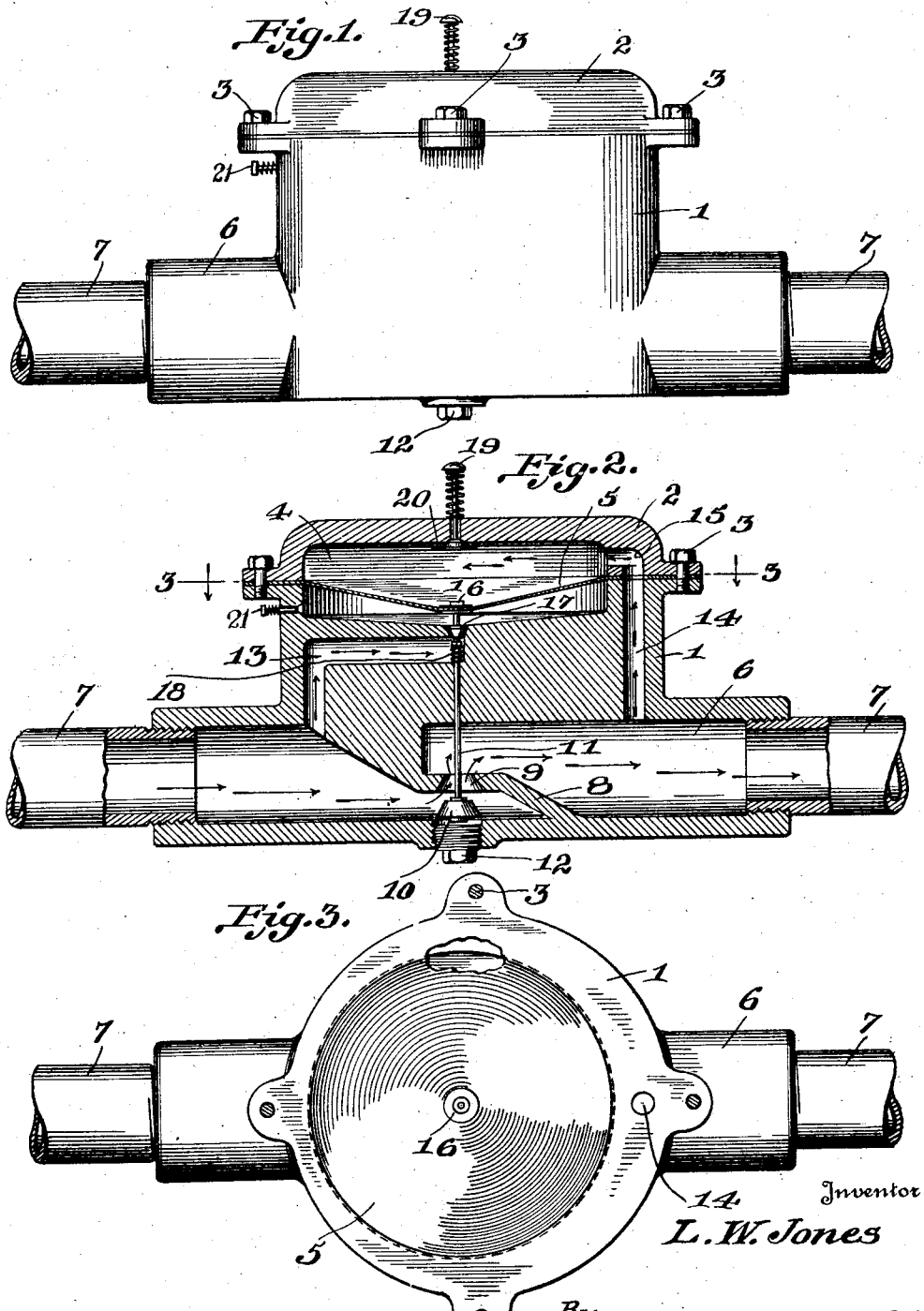

Patented Mar. 1, 1927.

1,619,130

UNITED STATES PATENT OFFICE.

LESLIE W. JONES, OF CHARLESTON, WEST VIRGINIA, ASSIGNOR OF ONE-THIRD TO A. HOMER YOUNG AND ONE-THIRD TO C. LACO BRIGHT, BOTH OF CHARLESTON, WEST VIRGINIA.

SAFETY STOP VALVE.

Application filed April 26, 1926. Serial No. 104,717.

This invention relates to check or safety valves for automatically cutting off the flow of a fluid such as gas upon a cessation of pressure of the line, and has for its object to provide such a device of relatively simple and inexpensive construction which is reliable in operation.

A further object of the invention resides in the provision of such a valve in which the pressure in the conduit will assist in maintaining the valve closed after it has once been closed due to a cessation of pressure.

Other objects and advantages of the invention will be apparent from the following description when taken in connection with the accompanying drawings; in which, Figure 1 is a side elevation of the apparatus.

Figure 2 is a vertical section through the valve mechanism showing the valve in open position; and Figure 3 is a horizontal section taken on line 3—3 of Fig. 2.

Referring to the drawings in greater detail the numeral 1 indicates a valve casing in which the operating parts of the apparatus are situated. This casing includes the body portion and a cap or top portion 2 which is bolted to the body portion by means of bolts 3. Complementary recesses are formed in the cap and body portion which provide a pocket 4 in which is seated a flexible diaphragm 5 clamped between the flanges of the body portion and cap when the same are bolted together by means of the bolts 3.

The casing 1 is also provided with a radially extending conduit 6. To the ends opposite are attached the pipe 7 forming the conduits for the gas or other fluid under control by the valve. A partition 8 is provided within the conduit 7 and has formed therein a valve seat 9 for cooperation with the valve 10 carried on the lower end of the vertically reciprocable rod 11. Below the valve 10 is provided removable plug 12 by means of which the conduit may be drained when necessary, and which also permits attachment of the valve 10 to the rod 11.

The casing 1 is also provided with a passage 13 opening into conduit 6 on one side of the valve 10 and a passage 14 opening into the conduit 6 on the opposite side of the valve 10. This latter passage communicates with a passage 15 formed in the cap member 2. By this construction it will be apparent that the conduit 6 may be opened to either side of the diaphragm 5 depending upon the position of the valve mechanism, a portion of which has been previously described.

The upper end of the rod 11 is fixedly secured to the center of the diaphragm 5 as indicated by numeral 16, and carried by this rod just below the upper end thereof is a second valve 17 which co-operates with a valve seat formed in the bottom of the pocket 4. The rod as well as the two valves 10 and 17 carried thereby, is normally held at the upper limit of its reciprocable movement by means of a coil spring 18.

Located in the top of the cap 2 is the spring pressed plunger 19 provided with a disk 20 on its lower end which is seated within the pocket 5. The purpose of this plunger and disk, of course, is to move the valve rod 11 against the pressure of spring 18 to open the conduit 6 to the passage of gas or other fluid being controlled. A spring-pressed relief valve 21 is provided below the diaphragm 5 so that the operator may relieve the gas pressure in the compartment after valve 17 has closed. In operation, the parts being in the position shown in Figure 2, it will be apparent that the gas will flow through the conduit 6 and pipe 7 to the source of consumption and that this gas under pressure will also pass through the passages 14, 15 to the upper side of the diaphragm 6 thereby maintaining the valve 10 open against the pressure of spring 18. Should the gas pressure decrease or entirely cease at any time the pressure will be removed from the upper side of the diaphragm 5 and the spring 18 will flex the diaphragm upwardly, thereby closing valve 10 and opening valve 17. This movement, obviously, will shut off the passage of gas through the conduit 6 and will open passage 13 to the under side of the diaphragm. Should the pressure again come on it will pass up through passage 13 and pass the open valve 17 and assist the spring 18 in maintaining the diaphragm in its upwardly flexed position thereby positively holding the valve 10 against being opened unless it is manually opened by means of the plunger 19 and disk 20 secured thereto, and release of pressure below diaphragm 5 by means of the valve 21.

From the foregoing description taken in connection with the accompanying drawings it will be apparent that I have devised an exceedingly simple and inexpensive construction for preventing the accidental escape of gas into living rooms and the like due to cessation of the pressure; and that such means is controlled in part by the varying pressures of the gases themselves.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a device of the class described, a valve casing having a conduit therein, a diaphragm mounted therein, a valve positioned in said conduit, a spring pressed rod connecting said valve and diaphragm, said casing also provided with passages communicating with said conduit at opposite sides of said valve and extending to opposite sides of said diaphragm, and means exterior of said casing for moving said valve to open position.

2. In a device of the class described, a valve casing having a conduit extending therethrough and a pocket, a valve in said conduit, a diaphragm in said pocket, a second valve in the bottom of said pocket, a rod connecting said valves and diaphragm, said casing provided with passages leading from said conduit at opposite sides of said first-named valve to opposite sides of said diaphragm, one of said passages being controlled by said second-mentioned valve.

LESLIE W. JONES.